United States Patent
Choi et al.

(10) Patent No.: US 8,216,520 B2
(45) Date of Patent: Jul. 10, 2012

(54) PROCESS TO UPGRADE HEAVY OIL BY HOT PRESSURIZED WATER AND ULTRASONIC WAVE GENERATING PRE-MIXER

(75) Inventors: Ki-Hyouk Choi, Dhahran (SA); Ali H. Al-Shareef, Dhahran (SA)

(73) Assignee: Saudi Arabian Oil Company (SA)

( * ) Notice: Subject to any disclaimer, the term of this patent is extended or adjusted under 35 U.S.C. 154(b) by 67 days.

(21) Appl. No.: 13/212,509

(22) Filed: Aug. 18, 2011

(65) Prior Publication Data

US 2011/0297506 A1 Dec. 8, 2011

Related U.S. Application Data

(62) Division of application No. 12/277,270, filed on Nov. 24, 2008, now Pat. No. 8,025,790.

(60) Provisional application No. 60/990,648, filed on Nov. 28, 2007, provisional application No. 60/990,662, filed on Nov. 28, 2007, provisional application No. 60/990,658, filed on Nov. 28, 2007, provisional application No. 60/990,670, filed on Nov. 28, 2007, provisional application No. 60/990,641, filed on Nov. 28, 2007.

(51) Int. Cl.
*B06B 1/00* (2006.01)
*B01J 14/00* (2006.01)
*B01J 3/00* (2006.01)
(52) U.S. Cl. .................... 422/128; 422/129; 422/242
(58) Field of Classification Search .................... None
See application file for complete search history.

*Primary Examiner* — Randy Boyer
(74) *Attorney, Agent, or Firm* — Bracewell & Giuliani LLP

(57) ABSTRACT

A process for upgrading heavy oil by mixing the heavy oil with water fluid using an ultrasonic wave generator prior to increasing the temperature and pressure of the mixture to values near to or exceeding the critical point of water, to produce low pour point, high value oil having low sulfur, low nitrogen, and low metallic impurities for use as hydrocarbon feedstock.

3 Claims, 1 Drawing Sheet

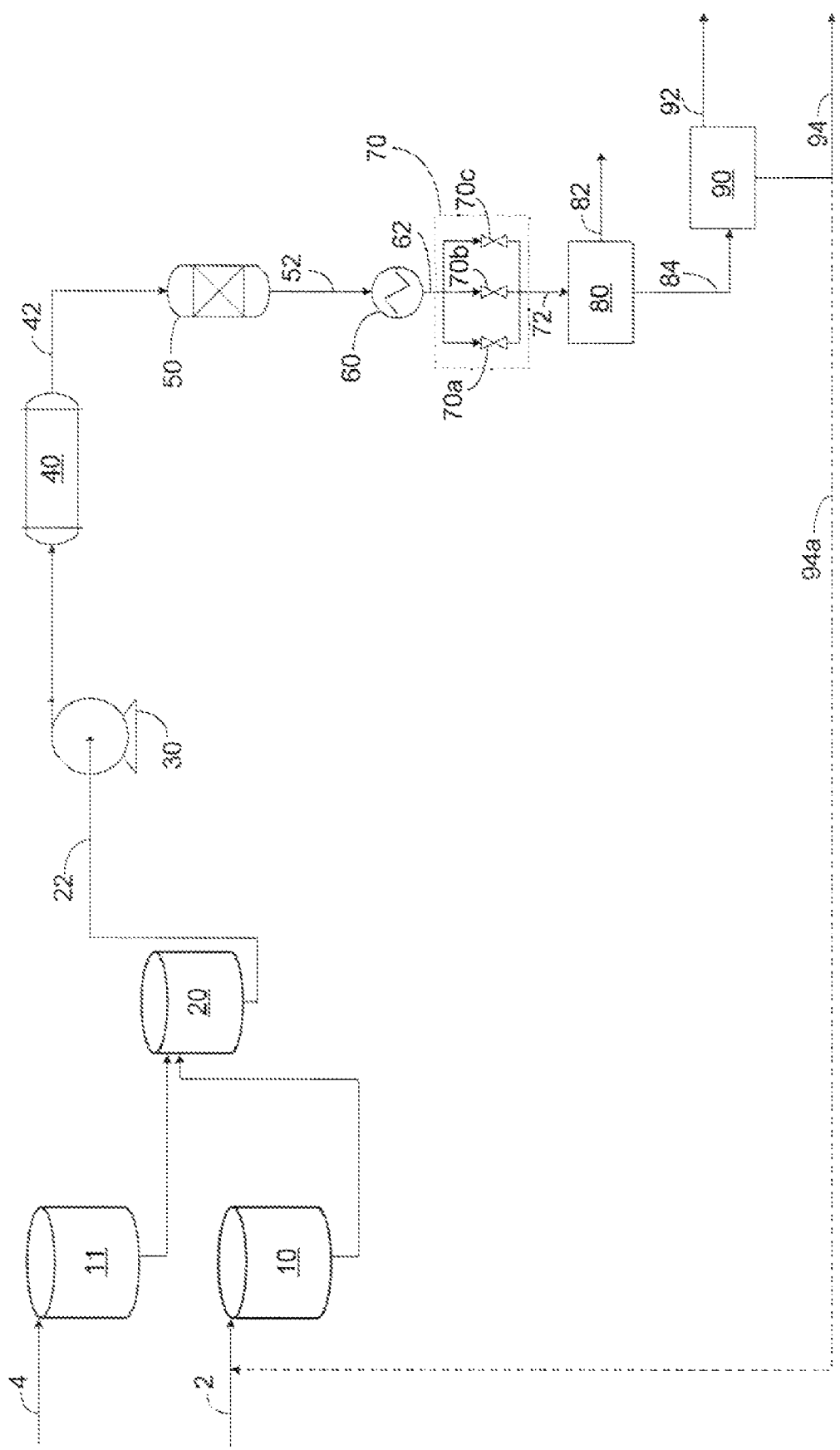

PROCESS TO UPGRADE HEAVY OIL BY HOT PRESSURIZED WATER AND ULTRASONIC WAVE GENERATING PRE-MIXER

RELATED APPLICATIONS

This patent application is a divisional application of U.S. patent application Ser. No. 12/277,270, which claimed priority to U.S. Provisional Patent Application Ser. Nos. 60/990,648; 60/990,662; 60/990,658; 60/990,670; and 60/990,641 filed on Nov. 28, 2007, which are all incorporated by reference in their entireties.

TECHNICAL FIELD OF THE INVENTION

The present invention relates to a process for upgrading heavy oil by contacting the heavy oil with supercritical water fluid. In particular, the hydrothermal upgrading process is accelerated by pre-mixing the water and heavy oil using an ultrasonic wave generator. Furthermore, the process is conducted without the use of an external supply of hydrogen to produce high value crude oil having low sulfur, low nitrogen, and low metallic impurities for use as hydrocarbon feedstock.

BACKGROUND OF THE INVENTION

World-wide demand for petroleum products has increased dramatically in recent years, depleting much of the known, high value, light crude oil reservoirs. Consequently, production companies have turned their interest towards using low value, heavy oil in order to meet the ever increasing demands of the future. However, because current refining methods using heavy oil are less efficient than those using light crude oils, refineries producing petroleum products from heavier crude oils must refine larger volumes of heavier crude oil in order to get the same volume of final product. Unfortunately though, this does not account for the expected increase in future demand. Further exacerbating the problem, many countries have implemented or plan to implement more strict regulations on the specifications of the petroleum-based transportation fuel. Consequently, the petroleum industry is seeking to find new methods for treating heavy oil prior to refining in an effort to meet the ever-increasing demand for petroleum feedstocks and to improve the quality of available oil used in refinery processes.

In general, heavy oil provides lower amounts of the more valuable light and middle distillates. Additionally, heavy oil generally contains increased amounts of impurities, such as sulfur, nitrogen and metals, all of which require increased amounts of hydrogen and energy for hydroprocessing in order to meet strict regulations on impurity content in the final product.

Heavy oil, which is generally defined as defined as bottom fraction from atmospheric and vacuum distillatory, also contains a high asphaltene content, low middle distillate yield, high sulfur content, high nitrogen content, and high metal content. These properties make it difficult to refine heavy oil by conventional refining processes to produce end petroleum products with specifications that meet strict government regulations.

Low-value, heavy oil can be transformed into high-value, light oil by cracking the heavy fraction using various methods known in the art. Conventionally, cracking and cleaning have been conducted using a catalyst at elevated temperatures in the presence of hydrogen. However, this type of hydroprocessing has a definite limitation in processing heavy and sour oil.

Additionally, distillation and/or hydroprocessing of heavy crude feedstock produce large amounts of asphaltene and heavy hydrocarbons, which must be further cracked and, hydrotreated to be utilized. Conventional hydrocracking and hydrotreating processes for asphaltenic and heavy fractions also require high capital investments and substantial processing.

Many petroleum refineries perform conventional hydroprocessing after distilling oil into various fractions, with each fraction being hydroprocessed separately. Therefore, refineries must utilize the complex unit operations for each fraction. Further, significant amounts of hydrogen and expensive catalysts are utilized in conventional hydrocracking and hydrotreating processes. The processes are carried out under severe reaction conditions to increase the yield from the heavy oil towards more valuable middle distillates and to remove impurities such as sulfur, nitrogen, and metals.

Currently, large amounts of hydrogen are used to adjust the properties of fractions produced from conventional refining processes in order to meet required low molecular weight specifications for the end products; to remove impurities such as sulfur, nitrogen, and metal; and to increase the hydrogen-to-carbon ratio of the matrix. Hydrocracking and hydrotreating of asphaltenic and heavy fractions are examples of processes requiring large amounts of hydrogen, both of which result in the catalyst having a reduced life cycle.

Supercritical water has been utilized as a reaction medium for cracking hydrocarbons with the addition of an external source of hydrogen. Water has a critical point at about 705° F. (374° C.) and about 22.1 MPa. Above these conditions, the phase boundary between liquid and gas for water disappears, with the resulting supercritical water exhibiting high solubility toward organic compounds and high miscibility with gases.

Hot pressurized water provides a reaction medium for the heavy components to be cracked into low molecular weight hydrocarbons through facilitating mass diffusion, heat transfer, intra- or inter-molecular hydrogen transfer, stabilizing radical compounds for suppressing coke formation and removing impurities such as sulfur, nitrogen and metal containing molecules. While the exact mechanism of the impurity removal has not been identified, the impurities seem to be concentrated in the coke or heavy fraction of the upgraded products. Through the use of supercritical water, these impurities are oxidized or otherwise modified to avoid deleterious effects. The basic principles of supercritical fluid extraction are outlined in the Kirk Othmer Encyclopedia of Chemical Technology, $3^{rd}$ Edition, John Wiley & Sons, Supplemental Volume, pp. 872-893 (1984).

However, utilizing supercritical water to upgrade heavy oil can have serious drawbacks. Heavy hydrocarbon molecules dissolute into supercritical water more slowly than their lighter counterparts. Furthermore, asphaltenic molecules, which have a tangled structure, do not untangle easily with supercritical water. Consequently, the portions of the heavy hydrocarbon molecules that do not make contact with the supercritical water decompose by themselves, resulting in large amounts of coke. Therefore, reacting heavy oil with supercritical water using current methods leads to accumulation of coke inside the reactor.

When coke accumulates inside a reactor, the coke acts as an insulator and effectively blocks the heat from radiating throughout the reactor, leading to increased energy costs, since the operator must increase the operating temperature to offset for the build-up. Furthermore, accumulated coke can also increase the pressure drop throughout the process line, causing additional increases in energy costs.

One of the causes of coke formation using supercritical water is attributable to limited availability of hydrogen. Several proposals have been suggested to supply external hydrogen to a feed hydrocarbon treated with supercritical water fluid. For example, hydrogen gas can be added directly to the feed stream. Carbon monoxide can also be added directly to the feed stream to generate hydrogen through a water-gas-shift (WGS) reaction between carbon monoxide and water. Organic substances such as formic acid can also be added to the feed stream to generate hydrogen through a WGS reaction with carbon monoxide, which is produced from decomposition of added organic substances and water. Additionally, a small amount of oxygen can be included in the feed stream to allow for oxidation within the feed matrix for generating carbon monoxide. This carbon monoxide can then be used in a WGS reaction for producing hydrogen. However, feeding any external gas into a liquid stream increases costs and introduces added complexity to the process.

One other possible solution to prevent coke build-up is to increase the residence time of the heavy oil within the reactor to dissolve all hydrocarbons into supercritical water; however, the overall economy of the process would be reduced. Additionally, improvements in reactor design could be helpful; however, this would require large expenditures in design costs and might ultimately not prove beneficial. Therefore, there is a need for a process to facilitate the efficient contacting of heavy oil with supercritical water, which does not result in large amounts of coke or substantial increases in operating costs.

As noted earlier, coking results from the inefficient contact of the heavy hydrocarbon molecules with the supercritical water. Therefore, in order to limit the production of low value coke, it would be advantageous to provide a process that increased the ability of the supercritical water to contact a larger portion of the heavy hydrocarbons.

Furthermore, it would be desirable to have an improved process for upgrading heavy oil with supercritical water fluid that requires neither an external supply of hydrogen nor the presence of an externally supplied catalyst. It would be advantageous to create a process and apparatus that allows for the upgrade of the heavy oil, rather than the individual fractions, to reach the desired qualities such that the refining process and various supporting facilities can be simplified.

Additionally, it would be beneficial to have an improved process that did not require complex equipment or facilities associated with other processes that require hydrogen supply or coke removal systems so that the process may be implemented at the production site.

SUMMARY OF THE INVENTION

The present invention is directed to a process that satisfies at least one of these needs. The present invention includes a process for upgrading heavy oil in the absence of externally supplied hydrogen. The process generally includes combining heavy oil with a water feed in a mixing zone to form a heavy oil/water mixture and subjecting the heavy oil/water mixture to ultrasonic waves prior to cracking the heavy components of the heavy oil/water mixture using supercritical water. The sonic waves break the moiety of heavy hydrocarbon molecules and facilitate mixing with the water, forming an emulsion-like phase referred to herein as a submicromulsion. This submicromulsion contains oil droplets that generally have a mean diameter of less than 1 micron, and the submicromulsion is created without an externally provided chemical emulsifier In one embodiment of the present invention, the process for upgrading heavy oil includes combining the heavy oil with the water feed in a mixing zone to form a heavy oil/water mixture. In one embodiment, the temperature of the heavy oil/water mixture does not exceed 150° C. The embodiment further includes subjecting the heavy oil/water mixture to sonic waves. The ultrasonic waves reduce the size of the oil droplets that are already suspended within the water phase to less than 1 micron in diameter, creating the submicromulsion. The submicromulsion is then pumped through a pre-heating zone using a high pressure pumping means. In one embodiment, the high pressure pumping means is a high pressure pump; however, one of ordinary skill in the arts will recognize other acceptable means. The high pressure pump increases the pressure of the submicromulsion to a target pressure exceeding the critical pressure of water. While the submicromulsion is within the pre-heating zone, the submicromulsion is subjected to a first target temperature that is in the range of about 150° C. to 350° C., creating a pre-heated emulsion. The embodiment also includes feeding the pre-heated submicromulsion into a reaction zone and subjecting the pre-heated submicromulsion to a second target temperature that is at or above the critical temperature of water, such that at least a portion of hydrocarbons of the pre-heated submicromulsion undergo cracking to create a hot adapted-mixture. The reaction zone includes a main reactor having an interior portion, the main reactor operable to withstand temperatures and pressures in excess of the critical temperature and critical pressure of water, and the reaction zone being essentially free of an externally-provided catalyst and essentially free of an externally-provided hydrogen source. Thus, the hot adapted mixture is essentially free of an externally-provided catalyst and essentially free of an externally provided hydrogen source. The embodiment can further include removing the hot adapted-mixture from the reaction zone, cooling the hot adapted-mixture to form a cooled adapted-mixture, and separating the cooled adapted-mixture to create upgraded oil and recovered water, wherein the upgraded oil is an upgraded heavy oil having reduced amounts of asphaltene, sulfur, nitrogen or metal containing substances as compared to the heavy oil.

Preferably, the recovered water is oxidized under supercritical conditions to form a treated water stream, wherein the treated water stream is then recycled back into the process by combining the treated water stream with the water feed. In another embodiment, the thermal energy contained in the hot adapted-mixture from the reaction zone and/or the treated water stream from the oxidation step can be captured and made operable for use for heat exchange anywhere in the process that heat energy can be used.

In a further embodiment of the present invention, the mixing zone comprises an ultrasonic wave generator, which is preferably a stick-type ultrasonic wave generator, a coin-type ultrasonic wave generator, or combinations thereof. Additionally, the step of mixing the heavy oil with the water feed can comprise using ultrasonic waves produced from the ultrasonic wave generator to produce the mixing effect, wherein the ultrasonic waves operate at a frequency, preferably from about 10 to 50 kHz, and more preferably from about 20 to 40 kHz. The heavy oil/water mixture has a residence time within the mixing zone, which is preferably in the range of 10 to 120 minutes. In yet another further embodiment, the main reactor can be a vertically oriented reactor, such that the pre-heated submicromulsion flows downwardly through the vertically oriented reactor.

In an alternate embodiment of the present invention, the process for upgrading heavy oil in an environment free of an externally supplied catalyst or externally supplied hydrogen source includes mixing heavy oil with the water feed in a mixing zone to form a heavy oil/water mixture, the heavy oil/water mixture being mixed at a slightly elevated temperature wherein the slightly elevated temperature does not exceed 150 degrees C. The slightly elevated temperatures can be achieved by either heating either feed stream prior to mixing, or by heating the heavy oil/water mixture in the mixing zone. Slightly elevated temperatures are temperatures that are slightly elevated in comparison to ambient temperature. Exemplary elevated temperatures include temperatures in the range of 50-150 degrees C.

This alternate embodiment further includes subjecting the heavy oil/water mixture to ultrasonic waves, thereby creating the submicromulsion, pumping the submicromulsion at a pressure exceeding the critical pressure of water to a pre-heating zone, and heating the submicromulsion in the pre-heating zone to a first target temperature that is in the range of about 150° C. to 350° C. to form the pre-heated submicromulsion. The pre-heated submicromulsion is then fed into the reaction zone and the temperature is increased within the reaction zone to a second target temperature that is at or above the critical temperature of water. This causes at least some of the hydrocarbons of the pre-heated submicromulsion to undergo cracking, forming a hot adapted-mixture. Additionally, the reaction zone is essentially free of an externally-provided catalyst and essentially free of an externally-provided hydrogen source. The hot adapted-mixture is then cooled and depressurized to form a depressurized adapted-mixture. The depressurized adapted-mixture is then separated into a gas portion and a liquid portion using at least one liquid-gas separator, and the liquid portion is further separated into upgraded oil and a recovered water stream using at least one oil-water separator. The upgraded oil recovered from the at least one oil-water separator is collected, wherein the upgraded oil is an upgraded heavy oil having reduced amounts of asphaltene, sulfur, nitrogen or metal containing substances as compared to the heavy oil.

The recovered water is oxidized under supercritical conditions to form a treated water stream, wherein the treated water stream is then recycled back into the process by combining the treated water stream with the water feed. In one embodiment, the thermal energy contained in the hot adapted-mixture from the reaction zone and/or the treated water stream from the oxidation step can be captured and made operable for use for heat exchange elsewhere in the process.

In a further embodiment of the present invention, the mixing zone comprises an ultrasonic wave generator, which is preferably a stick-type ultrasonic wave generator, a coin-type ultrasonic wave generator, or combinations thereof. Additionally, the step of mixing the heavy oil with the water feed can include using ultrasonic waves produced from the ultrasonic wave generator to produce the mixing effect, wherein the ultrasonic waves operate at a frequency, preferably from about 10 to 50 kHz, and more preferably from about 20 to 40 kHz. The heavy oil/water mixture has a residence time within the mixing zone that is preferably in the range of 10 to 120 minutes. In yet another further embodiment, the reaction zone includes a main reactor having an interior portion, wherein the main reactor includes a vertically oriented reactor, such that the pre-heated submicromulsion flows downwardly through the vertically oriented reactor.

In yet another embodiment of the present invention, the process for upgrading heavy oil in an environment free of an externally supplied catalyst or externally supplied hydrogen source includes combining heavy oil with a water feed in a mixing zone to form a heavy oil/water mixture, the heavy oil/water mixture being mixed at a slightly elevated temperature, wherein the slightly elevated temperature does not exceed 150 degrees C. The heavy oil/water mixture is subjected to ultrasonic wave energy, which acts to reduce the mixture's droplets sizes. The mixture is then heated, while under a pressure that is at or above the supercritical pressure of water, to a temperature that is at or above the supercritical temperature of water such that at least a portion of hydrocarbons in the heavy oil/water mixture undergo cracking. The cracked heavy oil/water mixture can then be cooled, depressurized and further separated into a gas phase, a recovered hydrocarbon phase, and a recovered water phase using a gas-liquid separator and an oil-water separator. The recovered hydrocarbon phase is an upgraded oil having reduced amounts of asphaltene, sulfur, nitrogen or metal containing substances as compared to the heavy oil.

The present invention is also directed to an apparatus for upgrading heavy oil in an environment free of an externally supplied catalyst or externally supplied hydrogen source. In one embodiment of the present invention, the apparatus comprises a mixing zone, a pre-heating zone, a high pressure pumping means and a reaction zone. In one embodiment, the mixing zone includes an ultrasonic wave generator. Furthermore, the mixing zone is operable to combine heavy oil with a water feed at a slightly elevated temperature. The pre-heating zone is fluidly connected with the mixing zone, with the pre-heating zone being operable to heat its contents to a temperature up to about 350° C. The high pressure pumping means is operable to increase pressure within the apparatus to exceed the critical pressure of water. The reaction zone includes a main reactor having an interior portion, wherein the reaction zone is fluidly connected with the pre-heating zone, and the main reactor is operable to withstand a temperature that is at least as high as the critical temperature of water. Additionally, the main reactor is operable to withstand pressure in excess of the critical pressure of water. In one embodiment of the present invention, the reaction zone is essentially free of an externally-provided catalyst and essentially free of an externally-provided hydrogen source.

In other embodiments of the present invention, the apparatus can also include a pressure regulating device, a liquid-gas separator fluidly connected to the pressure regulating device, and a water-oil separator that is fluidly connected to the liquid-gas separator. The liquid-gas separator being operable to create a liquid stream and a gas stream, and the water-oil separator being operable to create a recovered water stream and an upgraded hydrocarbon stream. In an additional embodiment of the present invention, the apparatus can also include an oxidation reactor that is fluidly connected with the water-oil separator via the recovered water stream. The oxidation reactor is operable to clean the recovered water before the recovered water is recycled and combined with the water feed.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 1 is an embodiment of the present invention.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

The present invention provides a process for converting heavy oil into more valuable crude oil feedstock without an external supply of hydrogen. In an embodiment of the present invention, the process of the present invention includes the steps of mixing the heavy oil and the water feed using an ultrasonic wave generator to produce a heavy oil/water mixture, and thereafter exposing the heavy oil/water mixture to a pre-heating stage, a reaction zone stage, a cooling stage, a depressurizing stage and multiple separating stages. Preferably, the thermal energy contained in the product stream from the reaction zone can be utilized to heat a feed stream by using suitable economizing equipment. Organic compounds included in the recovered water from the separating stage can be fully oxidized with hot pressurized water in the presence of oxygen to obtain clean water for recycling. The thermal energy that is contained in the product stream from the oxidation reaction can also be used for heat exchange purposes upstream.

Hot pressurized water provides a reaction medium for the heavy components to be cracked into low pour point and low molecular weight hydrocarbons through facilitating mass diffusion, heat transfer, intra- or inter-molecular hydrogen transfer, stabilizing radical compounds for suppressing coke formation and removing impurities such as sulfur, nitrogen and metal containing molecules, While the exact mechanism of the impurity removal has not been identified, the impurities seem to be concentrated in the coke, water or heavy fraction of the upgraded products. Through the use of supercritical water, these impurities are oxidized or otherwise Modified to avoid deleterious effects.

According to an embodiment of the present invention, the heavy oil and the water feed are introduced into the mixing zone, which is maintained at a slightly elevated temperature, preferably between 10° C. to 150° C., and more preferably between 30° C. to 70° C. The weight ratio of heavy oil to water, as measured at room temperature, is between 10:1 to 1:10 wt/wt, The mixing zone comprises an ultrasonic wave generator, which can be a stick-type, coin-type, or combinations thereof. Preferably, the ultrasonic wave generator is a stick-type. The frequency of the ultrasonic wave generator is preferably adjusted to be within the range of 10 kHz to 50 kHz, and more preferably within 20 kHz to 60 kHz. The residence time of the heavy oil/water mixture can be adjusted from 10 minutes to 120 minutes.

The ultrasonic waves produced by the ultrasonic wave generator reverberate throughout the heavy oil/water mixture causing the oil droplets to, in essence, break apart, resulting in a submicromulsion of water and oil whereby the oil droplets generally have mean diameters less than 1 micron. This submicromulsion reacts advantageously under supercritical conditions because the submicromulsion allows for improved contact between the heavy molecules and supercritical water, thereby reducing the overall production of low value coke. Additionally, some of the energy given off by the ultrasonic waves is transformed into heat energy, which in turn causes the submicromulsion's temperature to increase. Therefore, the mixing zone preferably comprises a temperature controller, such that the temperature within the mixing zone can be maintained within the preferred parameters mentioned above.

The submicromulsion is then introduced into a pre-heating zone at a pressure exceeding the critical pressure of water via a high pressure pumping means. In one embodiment of the present invention, the high pressure pumping means is a high pressure pump. The pre-heating zone, which preferably comprises a heater and a tube, subjects the submicromulsion to a first target temperature that is in the range of about 150° C. to 350° C. to form a pre-heated submicromulsion. Heating for this purpose can be provided by heat exchanging the feed stream with, for example, the product stream from the reaction zone stage or the treated water stream from the oxidation reactor.

The pre-heated submicromulsion is then fed into the reaction zone. The reaction zone, which in one embodiment is surrounded by a heater, increases the temperature of pre-heated submicromulsion up to 374° C. to 600° C., while maintaining pressure above the critical pressure of water. In the reaction zone, large hydrocarbon molecules are broken down into smaller molecules. Additionally, impurities such as sulfur, nitrogen and metal containing molecules are removed in this stage. The product stream from the reaction zone, which is a hot adapted mixture, is then cooled down and depressurized by a pressure regulating device, creating a depressurized adapted-mixture, which is then separated into a gas portion and a liquid portion by a series of suitable separators.

The liquid portion of the depressurized adapted-mixture is then separated into upgraded oil and recovered water by an oil-water separator. Optionally, the recovered water from the oil-water separator is treated with oxygen under supercritical conditions to remove oily impurities contained in the recovered water by an oxidation reactor to form a treated water stream. Oxygen used for this purpose can be supplied from oxygen gas, hydrogen peroxide, organic peroxide, and air. The treated water stream exiting the oxidation reactor has high thermal energy resulting from the oxidation reaction. Therefore, the treated water stream can be heat exchanged with, for example, the feed stream for the reaction zone and/or oxidation reactor.

The upgraded oil recovered from the oil-water separator contains a reduced amount of sulfur, nitrogen, and metallic compounds than the heavy oil feed. As such, the upgraded oil is high quality feedstock for use in a refining process.

Now turning to FIG. 1. Water feed [2] enters the continuous process and is fed into water storage tank [10]. From water storage tank [10], water feed [2] is fed into mixing zone [20] and combined with heavy oil [4] to form a heavy oil/water mixture. Heavy oil [4] is fed into mixing zone [20] from heavy oil storage tank [11]. Mixing zone [20] comprises an ultrasonic wave generator that supplies ultrasonic waves to the mixing zone at frequencies of 10 kHz to 50 kHz causing the two liquids to further mix, resulting in submicromulsion [22]. Submicromulsion [22] comprises oil droplets having an average mean diameter of less than 1 micron and is created in the absence of an externally provided chemical emulsifier. Submicromulsion [22] is then pressurized to a pressure exceeding the critical pressure of water via high pressure pump [30] and fed into pre-heating zone [40], wherein the temperature is increased to a first target temperature within the range of 150° C. to 350° C., to form pre-heated submicromulsion [42].

Pre-heated submicromulsion [42] is then fed into main reactor [50], wherein the pressure is maintained above the critical pressure of water, and pre-heated submicromulsion [42] is heated to a target temperature that is at least as high as the critical temperature water, such that at least some of the hydrocarbons of pre-heated submicromulsion [42] undergo cracking, forming hot adapted-mixture [52], main reactor [50] having a reaction zone that is essentially free of an externally-provided catalyst and essentially free of an externally-provided hydrogen source. Hot adapted-mixture [52] is then cooled using any acceptable means of cooling [60], preferably a heat exchanger, creating cooled adapted-mixture [62]. Cooled adapted-mixture [62] is then depressurized by pressure regulating device [70] to create a pressure reduced adapted-mixture [72]. In another embodiment, pressure regulating device [70] comprises at least two pressure regulating valves, and more preferably three pressure regulating valves [70a, 70b, 70c] connected in a parallel fashion. This arrangement advantageously provides for continued operation in the event the primary regulating valve becomes plugged. Pressure reduced adapted-mixture [72] then enters liquid-gas separator [80], wherein pressure reduced adapted-mixture [72] is separated into gas portion [82] and liquid portion [84]. Liquid portion [84] is then fed into oil-water separator [90] to yield reformed heavy fraction [92] and recovered water [94]. In an alternate embodiment, recovered water [94a] can be recycled back into the process, preferably before water storage tank [10] to be re-used as water feed [2].

The process of the present invention is further demonstrated by the following illustrative embodiment, which is not limiting of the process of the present invention.

Illustrative Embodiment

Residue from a vacuum distillation having properties according to Table I is processed by the process of the present invention. Firstly, feed heavy oil and distilled water are charged into a mixing vessel in the amount of one liter and four liters, respectively. The mixing vessel has a capacity of eight liters and is equipped with an ultrasonic homogenizer operating at 30 kHz. The homogenizer is operated at 500 watts for one hour, and the temperature of the mixing vessel is maintained at 50° C. Using a high pressure pump, the mixture is then fed into a pre-heating zone where the temperature of the mixture is increased to 250° C. This heated mixture is then introduced into a reaction zone while maintaining pressure at 25 MPa, and heated to a temperature of 450° C. for approximately 60 minutes. The output from the reaction zone is heat-exchanged with the feed to the pre-heating zone, and is then released to about 0.1 MPa by the pressure regulating device, preferably a back pressure regulator. Output from pressure regulating device is then fed into the liquid-gas separator, The liquid portion from the liquid-gas separator is then fed into an oil-water separator. A de-emulsifier is added to the liquid portion to accelerate phase separation. The oil is collected and analyzed. The total liquid yield is above 91.5 weight %. The amount of coke and gas formed during treatment is 2.5 and 6.0 weight %, of feedstock, respectively. API gravity of the final oil is 12.5, with the total sulfur content being 2.65 weight %. Nickel and vanadium are practically completely removed as they have a negligible content in the final oil.

TABLE I

Illustrative Embodiment

| Property | Value |
| --- | --- |
| Density, ° API | 2.6 |
| CCR, weight % | 29.6 |
| Nitrogen, weight % | 0.49 |
| Sulfur, weight % | 5.5 |
| Vanadium and Nickel, wt ppm | 157 |

Advantageously, the current invention allows the preparation of a submicromulsion without the need for emulsifiers. Similarly, the current invention surprisingly produces very little or no coke. In one embodiment, the present invention is believed to produce only 2.5 weight % of coke, as compared to much higher levels of coke in the prior art.

As used herein, the terms first and second and the like should be interpreted to uniquely identify elements and do not imply or restrict to any particular sequencing of elements or steps.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An apparatus for upgrading heavy oil in an environment free of an externally supplied catalyst or externally supplied hydrogen source, the apparatus comprising:
   a mixing zone operable to combine heavy oil with a water feed at a slightly elevated temperature to create a heavy oil/water mixture, the mixing zone comprising an ultrasonic wave generator;
   a pre-heating zone that is fluidly connected with the mixing zone, the pre-heating zone operable to heat the heavy oil/water mixture to a temperature up to about 350° C.;
   a high pressure pumping means, the high pressure pumping means operable to increase pressure of the heavy oil/water mixture to at least the critical pressure of water; and
   a reaction zone comprising a main reactor having an interior portion, the reaction zone is fluidly connected with the pre-heating zone; the main reactor being operable to withstand a temperature that is at least as high as the critical temperature of water; the main reactor being operable to withstand pressure in excess of the critical pressure of water, the reaction zone being essentially free of an externally-provided catalyst and essentially free of an externally-provided hydrogen source.

2. The apparatus of claim 1, further comprising:
   a pressure regulating device;
   a liquid-gas separator fluidly connected to the pressure regulating device, the liquid-gas separator operable to create a liquid stream and a gas stream; and
   a water-oil separator fluidly connected to the liquid-gas separator via the liquid stream, the water-oil separator operable to create a recovered water stream and an upgraded hydrocarbon stream.

3. The apparatus of claim 2, wherein the recovered water stream can be recycled and combined with the water feed, and the apparatus further comprising an oxidation reactor fluidly connected with the recovered water stream, the oxidation reactor operable to clean the recovered water stream via oxidation.

* * * * *